United States Patent [19]

Davis et al.

[11] 4,075,180
[45] Feb. 21, 1978

[54] POLYESTERS CONTAINING A CRITICAL RANGE OF 1,4-CYCLOHEXANEDICARBOXYLIC ACID

[75] Inventors: Burns Davis; Frederick David Petke, both of Kingsport, Tenn.

[73] Assignee: Eastman Kodak Company, Rochester, N.Y.

[21] Appl. No.: 749,190

[22] Filed: Dec. 9, 1976

[51] Int. Cl.² ............................................. C08G 63/12
[52] U.S. Cl. .................................... 260/75 R; 156/332
[58] Field of Search ........................... 260/75 R, 47 C; 156/332

[56] References Cited

U.S. PATENT DOCUMENTS

| | | |
|---|---|---|
| 3,143,526 | 8/1964 | Caldwell et al. ................. 260/75 R |
| 3,505,293 | 4/1970 | Bond et al. ....................... 260/75 R |
| 3,725,343 | 4/1973 | Schreyer ..................... 260/75 R X |
| 3,776,886 | 12/1973 | Schreyer ..................... 260/75 R X |

*Primary Examiner*—Lucille M. Phynes
*Attorney, Agent, or Firm*—Charles R. Martin; Daniel B. Reece, III

[57] ABSTRACT

Disclosed are polyesters composed of 1,4-cyclohexanedicarboxylic acid, terephthalic acid and 1,4-butanediol, wherein the 1,4-cyclohexanedicarboxylic acid is within a critical range of about 25 to about 58 mole percent. These polyesters exhibit desirable adhesive properties.

3 Claims, 1 Drawing Figure

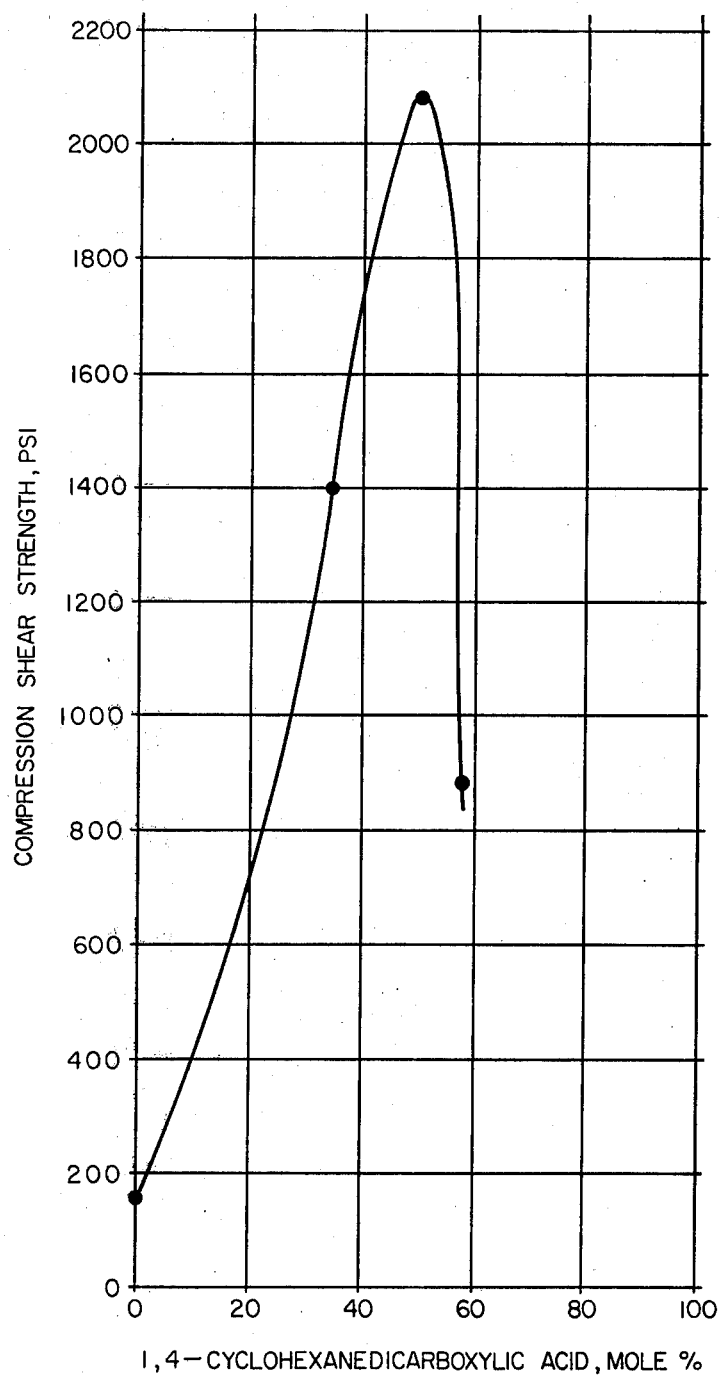

POLYESTERS CONTAINING A CRITICAL RANGE OF 1,4-CYCLOHEXANEDICARBOXYLIC ACID

This invention relates to polyesters containing a critical range of 1,4-cyclohexanedicarboxylic acid. These polyesters are useful as hot melt adhesives for joining plastic pipe.

The use of plastic pipe in construction of homes, buildings and recreational vehicles is increasing considerably each year. These pipes are principally used for water supply pipes, drain pipes and vent pipes. Although numerous kinds of plastics can be used for plastic pipes, two of the most widely used plastics are copoly(acrylonitrile/butadiene/styrene), often called ABS, and poly(vinyl chloride), often called PVC.

Plastic pipes such as ABS and PVC are presently being assembled using a solvent containing adhesive composed of a polymer similar to the pipe to be joined dissolved in a suitable solvent, such as tetrahydrofuran or methyl ethyl ketone. In order to join two sections of pipe, the pipe ends are cleaned, wiped with the solvent containing adhesive and twisted together to form the joint.

Although the use of solvent containing adhesives offers many advantages, there are still numerous problems associated with the use of solvent containing adhesives. One problem is that open time of the adhesive is limited by evaporation of the solvent to a few seconds on a hot day. Another problem is that a considerable amount of adhesive is often wasted due to spillage and due to solvent loss when containers are left open between uses. Still another problem is that separate adhesives must be manufactured, stored, and used for bonding PVC and ABS pipe. Still another problem is that the use of solvent containing adhesives may cause a fire hazard when used in a closed or nonventilated space due to the accumulation of solvent vapors. In addition, the use of solvent containing adhesives is undesirable because of environmental concerns involved with the solvent escaping to the atmosphere.

The use of hot melt adhesives to bond plastic pipe is an attractive approach to overcoming many of the problems associated with the use of solvent containing adhesives.

Polyester hot melt adhesives are well known in the art and are well suited for bonding paper, leather and even wood surfaces. While polyester hot melt adhesives are well suited for bonding various types of materials, polyester hot melt adhesives have not been commercially accepted for bonding plastic pipe, particularly ABS pipe, because of the unacceptable strength of the bond.

We have now discovered a polyester that exhibits exceptionally high bond strength when used as a hot melt adhesive to join ABS pipe.

The polyesters of this invention can be described as consisting essentially of
A. a dicarboxylic acid component which is
  1. about 25 to about 58 mole percent 1,4-cyclohexanedicarboxylic acid, and
  2. about 75 to about 42 mole percent terephthalic acid, and
B. 1,4-butanediol.

In a preferred embodiment of the invention the dicarboxylic acid component is 37 to 55 mole percent 1,4-cyclohexanedicarboxylic acid and 63 to 45 mole percent terephthalic acid. In a particularly preferred embodiment the dicarboxylic acid component is about 50 mole percent 1,4-cyclohexanedicarboxylic acid and about 50 mole percent terephthalic acid.

The polyesters of this invention can be prepared by methods for preparing high molecular weight polyesters well known in the art, such as direct condensation or ester interchange. Preferably the polyesters are prepared by ester interchange whereby dialkyl esters of terephthalic acid and 1,4-cyclohexanedicarboxylic acid, such as dimethyl terephthalate and dimethyl 1,4-cyclohexanedicarboxylate, are reacted with 1,4-butanediol to form a mixture of the bis esters of terephthalic acid and 1,4-cyclohexanedicarboxylic acid and then the mixture of bis esters is polycondensed at high temperature and low pressure to form a high molecular weight polymer.

The polyesters of this invention have an inherent viscosity of at least 0.4, and preferably at least 0.6, measured at 25° C, using 0.50 grams of polymer per 100 ml. of a solvent composed of 60 volumes of phenol and 40 volumes of tetrachloroethane. Inherent viscosities of 0.65 to 0.85 are preferred.

The prior art applicants are aware of U.S. Pat. Nos. 3,278,959, 3,278,960, 3,232,813, 3,235,520, 3,329,740, British Patent Specification Nos. 998,654, 962,853 and South African No. 68/7265.

Applicant regards the closest prior art to be South African No. 68/7265. This published patent application discloses polyester adhesives containing terephthalic acid, isophthalic acid, hexahydrophthalic acid, a linear aliphatic dicarboxylic acid and a glycol which can be 1,4-butanediol.

The polyesters of this invention are thought to be novel over the disclosure of South African No. 68/7265 because the specific range of about 25 to about 58 mole percent 1,4-cyclohexanedicarboxylic acid used in the polyester of this invention is not disclosed.

The polyesters of this invention are thought to be unobvious over the disclosure of South African No. 68/7265 because the adhesion of the polyesters of this invention to ABS pipe is unobvious over the adhesion to ABS pipe of similar polyesters prepared from terephthalic acid, 1,4-butanediol and an amount of 1,4-cyclohexanedicarboxylic acid that is below about 25 mole percent or above about 58 mole percent. Thus, the unobvious adhesion of the polyesters of this invention result from the use of a critical range of 1,4-cyclohexanedicarboxylic acid as distinguished from use of an amount of 1,4-cyclohexanedicarboxylic acid either above or below the critical range.

The unobvious adhesion properties of the polyesters of this invention can be fully appreciated by considering the attached FIGURE.

In the FIGURE, the horizontal scale represents the amount of 1,4-cyclohexanedicarboxylic acid in the polyester, expressed in mole percent. The vertical scale represents the adhesion properties of the polyester when ABS plastic is joined to ABS plastic, measured in compression shear strength, which is expressed in pounds per inch. Presented in the FIGURE is a curve correlating the relationship between the mole percent of 1,4-cyclohexanedicarboxylic acid in the polyester and the adhesion of the polyester to ABS pipe.

The data used to prepare the curve in the FIGURE are obtained by preparing polyesters containing 0, 35, 50 and 58 mole percent 1,4-cyclohexanedicarboxylic acid. The polyesters are prepared by ester interchange procedures well known in the art. The compression shear strength of each of the polyestes is then determined by preparing adhesive bonds and testing the bonds.

The adhesive bonds are prepared by applying the polyesters to pipe grade ABS plastic as described in ASTM procedure D2235 using a Nordson Model AD-25 handgun operated with a barrel temperature of 300° C. Mating of the pieces to be bonded is delayed 15 seconds before the bonds are completed. The bonds are then aged three days at room temperature.

The compression shear strength of each of the bonds is then determined using ASTM procedure D2235 employing a crosshead speed of 0.05 inch per minute. The values of compression shear strength for each of the polyesters is then plotted on the FIGURE and the curve is prepared.

As will be appreciated from a consideration of the curve in the FIGURE, if less than about 25 mole percent, 1,4-cyclohexanedicarboxylic acid or more than about 58 mole percent 1,4-cyclohexanedicarboxylic acid is used, the compression shear strength is less than about 900 psi. In contrast, if the amoount of 1,4-cyclohexanedicarboxylic acid is from about 25 to about 58 mole percent, the compression shear strength is unobviously high. For example, in the preferred range of 37 to 55 mole percent 1,4-cyclohexanedicarboxylic acid, the compression shear strength is a minimum of about 1600 psi and achieves a maximum value of about 2100 psi at about 50 mole percent 1,4-cyclohexanedicarboxylic acid.

The polyesters of this invention have been described as "consisting essentially of" 1,4-butanediol and the dicarboxylic acid components. By the term "consisting essentially of" we mean that these polyesters can contain other materials as long as the unobvious adhesion properties are retained. For example, other dicarboxylic acids and diols could be used, even in major amounts, if the resulting polyester retains the unobvious adhesion properties of the polyester of the invention. Also, conventional additives for adhesives, such as antioxidants, stabilizers, pigments and the like can be incorporated into the polyester of this invention as long as the polyester retains its unobvious adhesion properties.

The polyesters of this invention can be used as a hot melt adhesive using apparatus and techniques well known in the art.

As is well known in the art, the 1,4-cyclohexanedicarboxylic acid useful in this invention can exist as both a trans and cis isomer. Preferably, in this invention, the 1,4-cyclohexanedicarboxylic acid used to prepare the polyesters of this invention has a trans isomer content of about 30–40 percent.

Although the polyester hot melt adhesives of this invention are particularly adapted for joining ABS pipe, these polyesters are useful in other adhesive applications. For example, the polyester hot melt adhesives of this invention can be used to bond PVC pipe together. In addition, the polyester hot melt adhesives of this invention are useful for joining ABS pipe to PVC pipe. Also, the polyester hot melt adhesives of this invention can be used for bonding PVC to various substrates, such as wood, glass and metal. In addition, the polyesters of this invention are useful as adhesives for polyester fabric. More specifically, within the lower range of 1,4-cyclohexanedicarboxylic acid the polyester exhibits acceptable adhesive properties and, in addition, the adhesive film exhibits exceptional clarity so that the polyester does not show through the fabric.

I claim:

1. A polyester having an inherent viscosity of at least 0.4 measured at 25° C. using 0.50 gram of polymer per 100 ml. of a solvent composed of 60 volumes of phenol and 40 volumes of tetrachloroethane consisting essentially of
   A. a dicarboxylic acid component which is
      1. about 25 to about 58 mole percent 1,4-cyclohexanedicarboxylic acid, and
      2. about 75 to about 42 mole percent terephthalic acid, and
   B. 1,4-butanediol.

2. The polyester of claim 1 wherein the dicarboxylic acid component is 37 to 55 mole percent 1,4-cyclohexanedicarboxylic acid and 63 to 45 mole percent terephthalic acid.

3. The polyester of claim 2 wherein the dicarboxylic acid component is about 50 mole percent 1,4-cyclohexanedicarboxylic acid and about 50 mole percent terephthalic acid.

* * * * *